*(12)* United States Patent
Barie et al.

(10) Patent No.: US 7,345,449 B2
(45) Date of Patent: Mar. 18, 2008

(54) METHOD OF ROTATING A POLYPHASE MOTOR AT LESS THAN RATED SPEED

(75) Inventors: Walter G. Barie, Allison Park, PA (US); Ronald E. Vines, Gowanstown (CA); Harold D. Hagerty, Pittsburgh, PA (US)

(73) Assignee: Benshaw, Inc., Glenshaw, PA (US)

( * ) Notice: Subject to any disclaimer, the term of this patent is extended or adjusted under 35 U.S.C. 154(b) by 315 days.

(21) Appl. No.: 11/214,220

(22) Filed: Aug. 29, 2005

(65) Prior Publication Data

US 2007/0046247 A1     Mar. 1, 2007

(51) Int. Cl.
H02P 1/28       (2006.01)
H02P 6/08       (2006.01)
G01P 3/00       (2006.01)

(52) U.S. Cl. .................. 318/779; 318/778; 318/727; 318/809; 323/901; 323/238; 323/321

(58) Field of Classification Search .................. None
See application file for complete search history.

(56) References Cited

U.S. PATENT DOCUMENTS

| | | | |
|---|---|---|---|
| 4,176,306 A | 11/1979 | Asano et al. | |
| 4,486,698 A | 12/1984 | Blumner | |
| 4,736,148 A | 4/1988 | Hirata | |
| 4,996,470 A | 2/1991 | Rowan et al. | |
| 5,151,642 A * | 9/1992 | Lombardi et al. | 318/779 |
| 5,187,419 A * | 2/1993 | DeLange | 318/805 |
| 5,483,140 A | 1/1996 | Hess et al. | |
| 5,548,197 A * | 8/1996 | Unsworth et al. | 318/757 |
| 5,838,124 A | 11/1998 | Hill | |
| 5,859,514 A | 1/1999 | Chouffier et al. | |
| 5,914,583 A | 6/1999 | Botterbrodt | |
| 6,414,463 B1 | 7/2002 | Griepentrog et al. | |
| 6,590,362 B2 | 7/2003 | Parlos et al. | |
| 7,023,166 B1 * | 4/2006 | Kohen et al. | 318/727 |
| 7,193,387 B1 * | 3/2007 | Lu et al. | 318/800 |
| 7,196,491 B2 * | 3/2007 | Mayhew et al. | 318/778 |
| 7,227,326 B1 * | 6/2007 | Lu et al. | 318/461 |

* cited by examiner

*Primary Examiner*—Lincoln Donovan
*Assistant Examiner*—Eduardo Colon
(74) *Attorney, Agent, or Firm*—Metz Lewis LLC; Barry I. Friedman

(57) ABSTRACT

A polyphase AC induction motor is connected to a power supply through a soft starter having three sets of inverse parallel connected silicon controlled rectifiers with each set corresponding to one particular phase. Low speed starting and operation of the motor can be accomplished through triggering circuits controlling the phases of the triggering pulses in relation to the phases of the supply. The low motor speeds are developed by a gating sequence that generates a low frequency waveform that is less than the main supply frequency to the motor. This low frequency waveform is current and voltage controlled by the gating sequence to permit the AC motor to smoothly operate at speeds less than 100% of rated while developing net positive torque at the low controlled operating frequency.

26 Claims, 8 Drawing Sheets

METHOD OF ROTATING A POLYPHASE MOTOR AT LESS THAN RATED SPEED

FIELD OF THE INVENTION

The present invention relates to a controlled gating sequence utilized in conjunction with a polyphase silicon controlled rectifier-based solid-state starter to rotate an AC induction motor through control of current and frequency. Specifically, the controlled SCR gating sequence is used to rotate a standard three-phase AC induction motor at a speed corresponding to 1% to 44.4% of the rated motor speed. The controlled gating sequence enables low speed motor rotation, in addition to acceleration and deceleration of the motor, without additional hardware. The controlled gating sequence also provides a reduction of peak phase currents; minimization of motor heating; and generation of higher shaft torque than prior art.

BACKGROUND OF THE INVENTION

An AC induction motor is the most common type of motor used in industrial control systems. The AC induction motor offers simple, rugged construction, easy maintenance, and cost-effective pricing. Three-phase AC induction motors are utilized in many industrial environments, including chemical plants, foundries, pulp and paper plants, waste management facilities and rock crushers.

The basic components of an AC induction motor are the stator, rotor, and frame. The stator has coils of insulated wires, referred to as windings, which are directly connected to a power supply. The stator of a three-phase AC induction motor has three sets of windings. The stator windings are typically held stationary by the motor frame. Each stator winding is spaced at an equal distance from the other two windings and is connected to one of three lines of a three-phase power supply. The lines from the three-phase power supply provide current from each phase to the motor. As the windings magnetize in sequence, the phase currents also peak in sequence and create a rotating magnetic field within the stator. The rotating magnetic field produced by the stator windings produces a transformer-like effect, induces a current in the unpowered rotor windings, and causes the rotor to produce its own magnetic field. The magnetic interaction between the stator and the rotor magnetic fields is an attractive force resulting in rotor movement.

Despite its usefulness and wide-ranging application, the AC induction motor has certain associated limitations. One limitation, in particular, is that it is inherently incapable of providing a wide range of variable speeds in operation, when connected to a typical utility power supply. However, the operation of an induction motor at less than its rated speed is a desirable and useful feature in industrial applications. For example, in the mining industry, a three-phase AC induction motor is commonly used on a conveyer belt. In this application, the user may desire to have slow speed control over the motor for the inspection and repair of the belt. To satisfy this function it is necessary to slowly turn the motor at an exact speed to properly position the belt.

In order to operate AC induction motors at less than rated speed, various low speed techniques have been used in the past. In one method, the supply voltage to the motor is switched on for brief time periods to partially start the motor and then the motor is quickly disconnected from the source and the motor is allowed to coast. As a result, the motor slowly turns. Additional full voltage pulses at line input frequency are then applied to the motor windings intermittently to keep the motor turning. Power can be applied to the motor intermittently either through the use of an electromechanical contactor or through the use of a solid-state device such as a soft starter. The disadvantages of this method include high transient currents, high transient torques, and potential overheating of the motor. Furthermore, this method does not posses any inherent speed control because the voltage and frequency applied to the motor is not being altered other than being applied intermittently.

Another method of controlling the speed of an AC induction motor is through the use of a variable frequency drive. A variable frequency drive converts the supply voltage and frequency to another voltage and frequency so the induction motor can operate at less than the rated speed. Pulse width modulation, or PWM, drives are the most common type of variable frequency drive. The PWM drive contains electronic circuitry to convert AC line power to DC power. The PWM drive then pulses the DC output voltage for varying lengths of time to mimic a voltage output at the frequency desired. More specifically, the PWM drive produces a voltage waveform which, when applied to the motor, results in a motor current waveform that is essentially sinusoidal and of the frequency corresponding to the desired fundamental output frequency. By varying output voltage and frequency, a variable frequency drive controls the torque, speed, and direction of an AC induction motor. However, the variable frequency drive tends to be more complex and expensive in comparison to other low speed methods, especially as motor horsepower and motor rated voltage increases.

A solid-state reduced voltage starter, in addition to soft starting a motor, can be used to rotate an induction motor at less than rated speed. The solid-state starter is placed in series between the power supply and the motor and employs solid-state switches, such as Silicon Control Rectifiers or SCRs, to control the application of current flow and voltage to the motor. Each SCR in a soft-starter can be phase controlled or zero fired. Zero firing turns the SCR completely on so the voltage applied to the load is similar to that of an electromechanical switch or contactor.

Phase-control firing requires manipulation of the SCR firing angle. The firing angle is defined as the number of degrees from the beginning of the associated half-cycle of the AC waveform to the angle at which the gate voltage is applied. By controlling the firing angle, the soft starter is able to control the output voltage by turning the appropriate SCR or other switching device on for a particular portion of each half-cycle. When the SCR is turned on, or gated, voltage is applied to the load. The magnitude of the voltage applied to the load depends on the timing of the input power supply and when the SCR is gated on. Phase-control provides infinitely variable adjustability voltage between zero and full input voltage to the load as timed gate pulses are fed to each SCR. For example, the earlier in the half-cycle the SCR is gated on, the greater voltage is applied to the load.

Variables pertaining to the firing of the SCRs can be modified through the control electronics of the solid-state starter to increase or reduce the output voltage. The control electronics can be preprogrammed to provide a particular output voltage contour based on a timed sequence or the output voltage can be controlled based on measurements of current and/or motor speed.

Controlling the speed of a motor through the use of a solid-state starter has a number of advantages. As stated, the output voltage can be easily altered to suit the required load conditions. Furthermore, the SCRs are solid-state devices. Therefore, SCRs have no moving parts and provide high reliability and low maintenance operation compared to electromechanical motor controllers. Finally, the mechanical stress and shock on the motor is greatly reduced due to the reduction of large torque transients as a result of phase control providing quieter motor operation, longer equipment life, less maintenance and increased uptime.

Because of these advantages, the solid-state starter has found increasing utilization in connection with special SCR firing patterns to rotate a motor at slow speeds. One commonly used SCR firing pattern, known as a pulse skipping pattern, generates four pulses of current for each phase of each output cycle, two positive and two negative, to generate slow motor speed. When reduced speed is desired, the SCRs are controlled so that selected cycle portions from each phase of the power supply voltage are omitted from the voltage applied to the motor. Consequently, the fundamental frequency of the output voltage is a predetermined fraction of the fundamental frequency of the source voltage, and the running speed of the motor will be correspondingly reduced compared to full rated speed. Examples of solid-state starters utilizing a pulse skipping pattern include the Benshaw RediStart Microll product as well as soft starter products from Allen Bradley and SquareD.

One disadvantage of the pulse skipping pattern is that in order to achieve a given average current in the motor to produce a required level of torque with only four pulses of current per phase per output cycle, results in the four pulses having very high peak currents. The high peak currents can tax the input supply system, causing various disturbances such as light flicker. These high peak currents further cause additional heating of the motor and source transformer due to the high levels of current and related harmonic heating losses. In addition, the limitation of four pulses of current for each cycle constrains the overall average motor current that can be achieved in the motor. This reduction in motor current reduces the maximum torque that can be generated by the motor during cycle skipping slow speed operation. Cycle skipping also creates a cogging motion, which further creates mechanical harmonics on the shaft of the motor.

A particular example of a pulse skipping SCR firing pattern is disclosed in Rowan, et al., U.S. Pat. No. 4,996,470, issued for Feb. 26, 1991, for Electric Motor Speed Control Apparatus and Method, which discloses a device and method to reduce the speed of an induction motor. The speed of the motor is initially reduced through a combination of dynamic electrical braking and AC pulse skipping to a speed at which is it no longer synchronized to the AC input supply frequency. At such time, AC pulse skipping is employed to slow the AC motor down even further. The AC pulse skipping is continued for operation of the apparatus at a continuous speed until the point at which the user desires to reduce the motor speed to zero. Dynamic motor braking is again employed to break the motor out of synchronism with the pulse skipping frequency. The motor can then be slowed to a speed from which a very accurate final stoppage of the motor can occur to precisely position a work piece.

The previously described disadvantages of pulse skipping apply to Rowan, et al. In addition, Rowan, et al., the slow motor speeds are limited to only a few defined speeds. Typically, pulse skipping methods are limited to two discrete forward speeds of 7% and 14% of rated speed and two discrete reverse speeds of 10% and 20% of rated speed because of the timing involved with the incoming power supply lines. The speeds utilized in Rowan, et al., correspond to an effective frequency that is a fundamental frequency component of the AC power supply input line frequency. This effective frequency is defined in Rowan, et al. by the known expression:

$$\frac{f_s}{(6n+1)}$$

where n is an integer and f is the frequency of the supply voltage. Rowan, et al., further teaches that only fundamental frequency components of ⅐ and ⅓ are preferred because lower frequencies tend to drive the motor at too slow of a speed for many applications.

Another example of AC pulse skipping for speed control is represented by Asano, et al., U.S. Pat. No. 4,176,306, issued Nov. 27, 1979, for a Speed Control Apparatus. Asano, et al., discloses a speed control apparatus that includes a plurality of switches disposed between a three-phase AC power source and a motor in addition to a low speed control device for feeding power having a frequency lower than the frequency of the power source to the motor under the control of the switches.

Similar to Rowan, et al., Asano, et al., is limited by the effective frequencies of defined by the above equation. By limiting the effective frequency of the method, Asano, et al., have determined specific set of operating speeds, as described above.

What is lacking in the present art therefore, is a method of rotating a three-phase motor at speeds less than the rated synchronous speed while satisfying the following criteria: the speed of motor rotation should not be restricted to only a minimal set of speed selections; the available motor current and torque should be maximized the harmonic and flickering effects on the power supply should be minimized and motor heating should be minimized by utilizing the maximum number of current pulses per output cycle.

SUMMARY OF THE INVENTION

A method rotating a polyphase motor at less than the rated speed using a controlled SCR gating sequence is disclosed that will enable low speed motor rotation without additional hardware above that contained in a solid state soft starter. The method is utilized in connection with a typical reduced voltage solid state starter connected to a polyphase power supply. The digital controller of the solid state starter is programmed to individually control the gating of each SCR. The solid state starter can therefore be programmed to apply a pulsed waveform to each of the phases of an AC induction motor. The motor preferably is a three phase motor, although six phase and other embodiments are contemplated. The output voltage of the solid state starter is a result of the overlap of the firing of certain SCRs, in accordance with a predetermined gating sequence and the voltage and phase relationship of the poly-phase power supply. This method of rotating a three-phase motor using the controlled SCR gating sequence generates higher torque than other prior art methods of slow speed induction motor operation. The method maintains the motor current at a predetermined level and can be applied to rotate the motor at user defined speeds from 1 to 44.4% of the rated motor speed. The speed selected by the user is correlated to a reference table that associates the number of input line cycles required to closely approximate the user-defined speed. The user-defined speed is further utilized to determine the total output period of the operation. The firing and conduction angle of each SCR is calculated based on the total output period and desired motor current.

The output voltage per input line cycle is divided into distinct output states. The output states correlate to different SCR firing patterns and are used to produce the user-desired motor rotational speed. The selected SCR gating pattern is chosen based on the desired speed of the motor. If the desired speed in a three phase embodiment is less than or equal to 8⅓%, a 30° single or double conduction pattern is used. A 30° conduction pattern has twelve output states for which certain combinations of SCRs are gated. The combinations of SCRs are predetermined and contained in a lookup table within the operating system of the solid state starter. At speeds greater than 8⅓%, a 60° conduction pattern is used. A 60° conduction pattern has six output states for which certain other combinations of SCRs are gated. In a six phase embodiment, these patterns are 15° and 30°, respectively. It is considered well within the ambit of one of ordinary skill to establish appropriate patterns for other phase embodiments. These combinations of SCRs are also predetermined and contained in a lookup table within the operating system of the reduced voltage starter. The conduction patterns and output states are appropriate if the motor is rotated in a forward or reverse direction.

Those skilled in the art will recognize that while specific implementations have been described herein, many others are possible in keeping with the ideas and approaches presented.

BRIEF DESCRIPTION OF THE DRAWINGS

FIG. 4. comprising

FIG. 5, comprising

DESCRIPTION OF THE PREFERRED EMBODIMENTS

Figure 1:
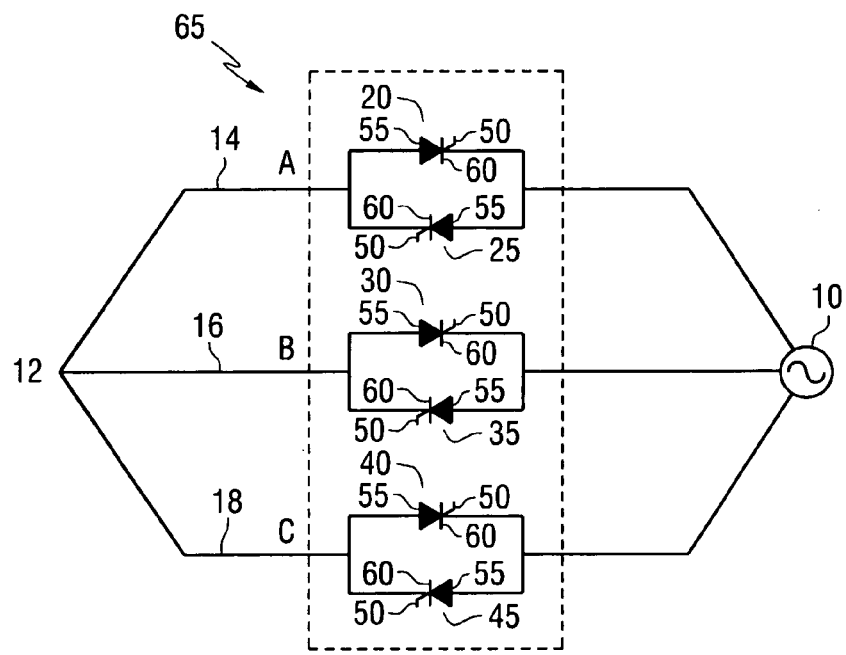
FIG. 1 is a diagrammatic view of a prior art six switch SCR-based solid state motor starter, as utilized in accordance with the present invention.
Figure 2:
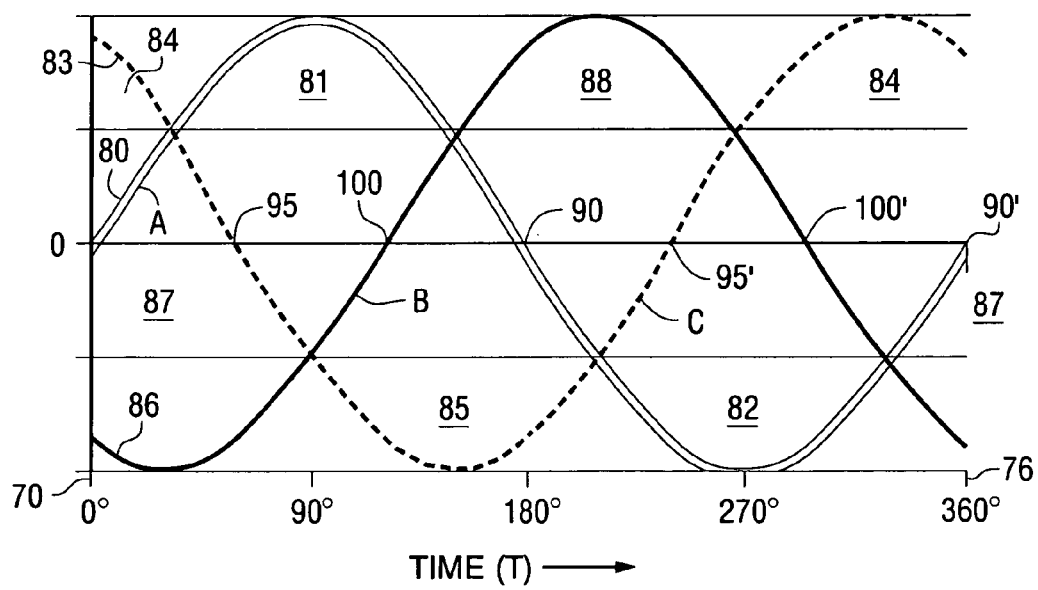
FIG. 2 is a graphical illustration of a known waveform output of a three-phase power supply, in accordance with the present invention.

Referring to FIG. 1, a three-phase AC induction motor 10 is connected to a three-phase AC power supply 12 through a solid state starter 65, represented diagrammatically. Power supply 12 is provided with three output phases comprising phase A, phase B and phase C corresponding to the phases shown in FIG. 2. However, it can be appreciated by one skilled in the art that power supply 12 can be any poly-phase power supply that supplies AC electrical power in overlapping phases. Referring to FIGS. 1 and 2, power supply 12 is connected to the stator (not shown) of the motor 10 through solid state starter 65 by three input lines that each correspond to a particular phase of power supply 12. For example, phase A corresponds to phase A input line 14; phase B corresponds to phase B input line 16 and phase C corresponds to phase C input line 18.

An input cycle is defined as the time that it takes for one phase of a 23 Hz to 72 Hz power supply 12 to complete one 360° cycle. For example, at 60 Hz, each phase of the power supply requires 16.667 milliseconds to complete a 360° cycle. The output cycle, as further described herein, is the time that it takes the output waveform of the solid state starter to complete one 360° cycle. In the present invention, the output is always at a lower frequency than the input such that a full output cycle will always take longer than an input cycle.

Each phase of power supply 12 carries power that is 120° or one-third of an input cycle offset in time from each of the other phases, as shown in FIG. 2. If a polyphase power supply other than three-phase power supply 12 is used in connection with the present invention, the input cycle offsets may vary from 120° but with a similar mathematical relationship.

The three-phase power supply 12 produces three separate waveforms, as shown in FIG. 2, with each waveform corresponding to a particular phase of power supply 12. Assuming a three phase Wye power supply configuration, FIG. 2 is a graphical representation of the variation of instantaneous line to neutral point voltage 70 with respect to time T for each of phase A, phase B and phase C. FIG. 2 represents one cycle of a three-phase system as it moves through each electrical angle 76 of the cycle. The electrical angles 76 are appropriately labeled 0°, 90°, 180°, 270° and 360° that indicate the particular electrical angle 76 in degrees. When any one sine wave is at zero the other two may still be delivering power to the motor depending on the conduction state of the SCRs associated with those phases.

Phase A is represented by sine wave 80, phase B is represented by sine wave 83 and phase C is represented by sine wave 86. Each phase has a positive half-cycle 84, 81 and 88, which is the time in degrees that the instantaneous voltage is positive, and a negative half-cycle 82, 85 and 87, during which time the instantaneous voltage is negative. At the end of each half-cycle, which lasts for 180°, each phase crosses the zero axis. For example, phase A crosses the zero axis at 90 and 90' corresponding to 180° and 360°, respectively; phase B crosses the zero axis at 95 and 95' and phase C crosses the zero axis at 100 and 100'.

Referring again to FIG. 1, each of phase A, phase B and phase C of power supply 12 is provided with an inverse parallel pair of SCRs 20, 25, 30, 35, 40 and 45 that are used to pass or block current passing through for the representative phase. Alternatively, each SCR 20, 25, 30, 35, 40 and 45 may be any type of current control device similar to an SCR. Although each phase of power supply 12 is associated with two SCRs 20, 25, 30, 35, 40 and 45, it can be appreciated by one skilled in the art that, with regard to higher voltage or higher current starters, each phase may consist of more than one SCR 20, 25, 30, 35, 40 and 45 in series or parallel. If more than one SCR is utilized in a switch, each SCR in that particular switch is gated on at the same time.

Each SCR 20, 25, 30, 35, 40 and 45 utilized in connection with the present invention is a conventional silicon controlled rectifier having a control means to regulate current and voltage flow to the motor. Each SCR consists of basic elements including a gate 50, an anode 55 and a cathode 60. SCRs 20, 30, and 40 are in an inverse parallel relationship with another SCR 25, 35 and 45. At least six SCRs are required in a three-phase solid state starter due to the inverse parallel relationship of the SCRs. Referring to FIG. 1 and 2, phase A has two associated SCRs. The first SCR 20 corresponds to the positive half-cycle 81 of sine wave 80 and a second SCR 25 that corresponds to the negative half-cycle 82. Similarly, phase B has a first SCR 30 that corresponds to the positive half-cycle 84 of sine wave 83 and a second SCR 35 that corresponds to the negative half-cycle 85 of sine wave 83. Finally, phase C has a first SCR 40 that corresponds to the positive half-cycle 88 of sine wave 86 and a second SCR 45 that corresponds to the negative half-cycle 87 of sine wave 86.

Without special gating control the solid state starter 65 would supply the input power supply frequency to motor 10. To achieve the desired lower output frequency, each of SCRs 20, 25, 30, 35, 40 and 45 must be gated as further described with respect to FIG. 7, to provide only the appropriate polarity and width of the input phase waveforms 80, 83 and 86 illustrated in FIG. 2. SCRs are line-commutated devices, meaning that the conducting SCRs are turned off by reducing the current through the SCR to zero. The current is reduced to zero by the reversal of the voltage applied to the SCR and load by the power supply. This voltage is supplied by power supply 12, as supplied through input lines 14, 16 and 18. Each SCR 20, 25, 30, 35, 40 and 45 is gated only once per input cycle. Therefore, only one pulse per SCR 20, 25, 30, 35, 40 and 45 is produced for each input cycle. For example, when using a 60 Hz power supply, one input cycle is completed in 16.667 milliseconds as described above. This corresponds to one possible positive and one possible negative pulse per SCR 20, 25, 30, 35, 40 and 45 every 16.667 milliseconds.

Solid state starter 65 is provided with a digital controller having control electronics and power switching electronics, as would be well known to those skilled in the art. The control electronics provide the firing or gating impulses for each SCR 20, 25, 30, 35, 40 and 45 as further described with respect to FIG. 6. The power switching electronics consist of the actual SCRs 20, 25, 30, 35, 40 and 45. The digital controller is provided with a real time operating system to handle the tasks performed by solid state starter 65 with respect to the firing of the SCRs 20, 25, 30, 35, 40 and 45. Examples of a real time operating systems can include Chimera, Lynx, MTOS, QNX, RTMX, RTX, uCOS-II, and VxWorks.

Figure 3:
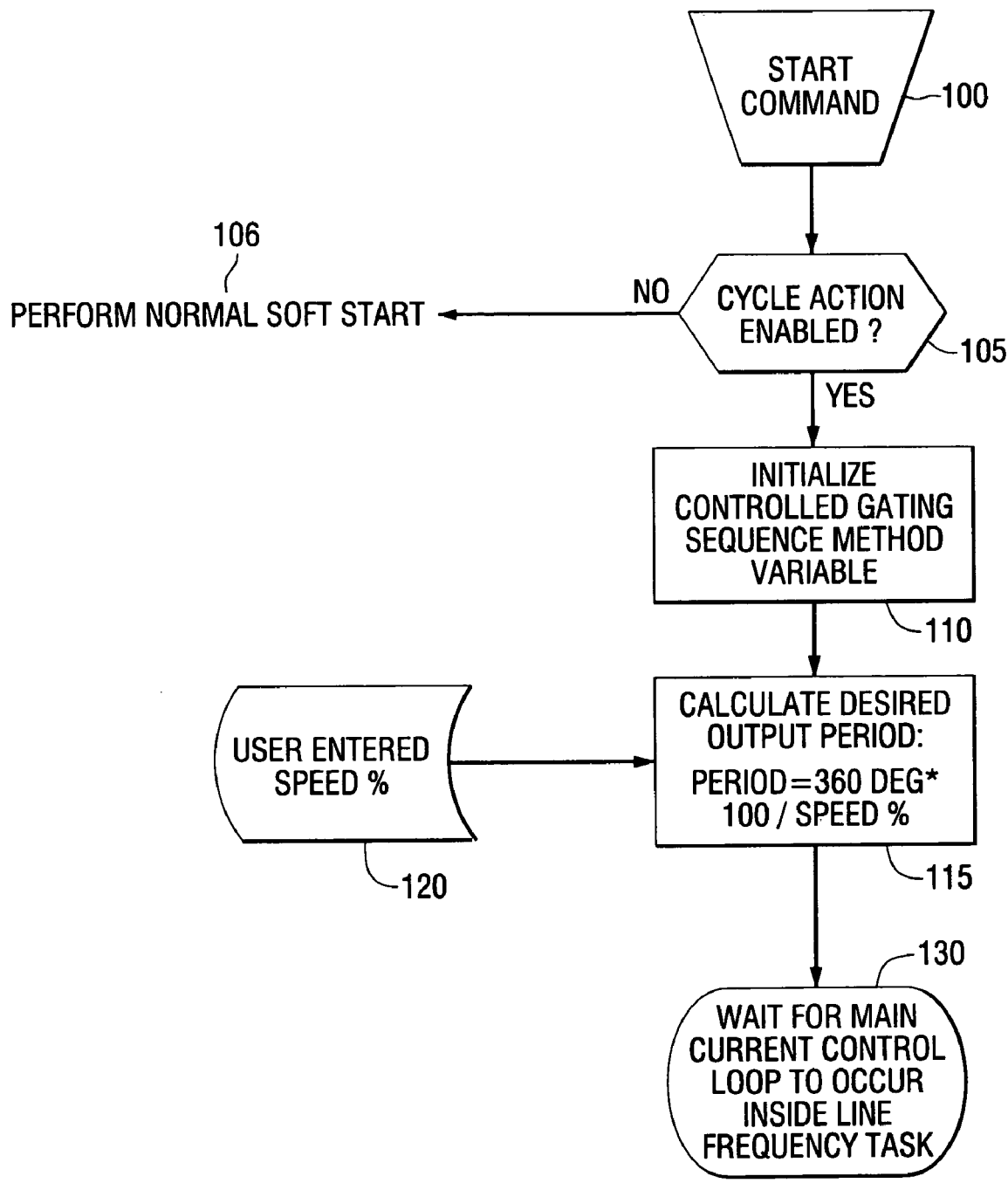
FIG. 3 is a diagrammatic representation of the sequence of steps performed during the initialization of an SCR-based solid state starter, as utilized in accordance with the present invention.

FIG. 3 is a diagrammatic illustration of the basic operation of solid state starter 65 during the initialization of operations by the digital controller. A start command 100 is received by the digital controller. The start command 100 can result from pressing a key on a remote key pad, a voltage input, or over a communication network. Next, the user must indicate to the device through a signal input or a preset user parameter if the controlled gating sequence method 105 of the present invention should be enabled. If the controlled gating sequence method 105 has not been enabled, the device will perform a normal soft start 106 of the motor, as previously described with regard to the basic operation of a solid state starter. If the controlled gating sequence method 105 has been enabled, the controlled gating sequence method variables are initialized at step 110 based on the preset user inputs. Among these user inputs is the desired speed of the motor in a range of one to forty-four percent of rated input line frequency motor speed.

The present invention can be used to output a speed between 0% and 44.4% of rated motor speed. However, certain selected speeds are more useful and favorable for use than others are. The motor speeds available for selection by the user to operate solid-state starter 65 in accordance with the method of the present invention are listed in Table 1. Speeds below 1% of rated are not typically necessary in most applications and therefore are not presently described.

TABLE 1

| Number of input line cycles per output cycle | Speed, % of Rated |
|---|---|
| 100 | 1 |
| 68 | 1.470588235 |
| 60 | 1.666666667 |
| 58 | 1.724137931 |
| 54 | 1.851851852 |
| 50 | 2 |
| 40 | 2.5 |
| 38 | 2.631578947 |
| 36 | 2.777777778 |
| 34 | 2.941176471 |
| 32 | 3.125 |
| 30 | 3.333333333 |
| 28 | 3.571428571 |
| 26 | 3.846153846 |
| 24 | 4.166666667 |
| 22 | 4.545454545 |
| 20 | 5 |
| 18 | 5.555555556 |
| 16 | 6.25 |
| 14 | 7.142857143 |
| 12 | 8.333333333 |
| 11 | 9.090909091 |
| 10 | 10 |
| 9 | 11.11111111 |
| 8 | 12.5 |
| 7 | 14.28571429 |
| 6 | 16.66666667 |
| 5 | 20 |
| 4 | 25 |
| 3 | 33.33333333 |
| 2.861111 | 34.9514563 |
| 2.666667 | 37.5 |
| 2.5 | 40 |
| 2.25 | 44.44444444 |

Based on the information provided by the user with respect to the speed input by the user at step 120, the device calculated the output period at step 115 by the calculation:

$$\text{Period} = \frac{360 \text{ degrees} * 100}{\text{Speed \% entered by user}}$$

The output period calculation at step 115 corresponds to the output cycle's period with respect to the total input supply electrical angle in degrees during which solid state starter 65 employs the controlled gating sequence method to achieve the speed selected by the user at step 120, as listed in Table 1. The output period calculated at step 115 is utilized in the current calculation loop and the SCR output state calculation of the Line Frequency Task that is further described herein with respect to FIG. 4. Solid-state starter 65 enters a standby state at step 130 until the Line Frequency task is triggered.

The preferred solid-state starter 65 output speeds listed in Table 1 have been selected based on the criteria of reducing DC offsets that may be generated in the phase current. When the number of input line cycles per output cycle is either an odd or non-integer number, DC current may be generated that produce DC offsets in the output waveform of solid-state starter 65.

Typically, direct current does not exist simultaneously in the same system with alternating current. The resulting waveform with DC offsets results from the addition of DC voltage generated in the phase current to the AC voltage of power supply 12. An offset can be produced which causes a vertical shift distortion in the output wave amplitude of solid-state starter 65. This DC waveform distortion, if applied to the motor, can cause torque ripple, act as a braking influence due to the production of retarding torque and can result in excessive heating of the motor.

With reference to Table 1, when the number of input line cycles per output cycle is an even number, an equal number of positive and negative current pulses are generated for each phase and thus prevents significant DC offset currents from occurring. At speeds that are available for selection as described in Table 1 equal to and slower than 8⅓%, the number of input line cycles per output cycle is always an even number. However, at speeds that are available for selection in accordance with Table 1 higher than 8⅓%, this is not always possible. For example, at a speed equal to 9.09% of the rated speed, the number of input line cycles per output cycle is eleven.

Although it is not possible to constantly maintain an even number of input line cycles per output cycles, it is desirable to have an integer number of input line cycles per output cycle to ensure smooth operation of solid state starter 65. When the number of input line cycles per output cycle is a non-integer, the number of associated current pulses is also a non-integer number, which can cause negative transient torques. For example, at speeds of 33⅓% and lower, each available speed corresponds to an integer number of input line cycles and, thus, an integer number of current pulses. However, at a higher speed, such as 34.95% of the rated motor speed, it is not possible to have an integer number of input cycles. At these speeds, direct current offsets and other similar effects can cause a distortion of the waveform shown in FIG. 2. Slight adjustments to the firing delay time of either the positive or negative SCR of each phase are necessary to prevent these DC offsets from occurring at these higher speeds.

Figure 4A:
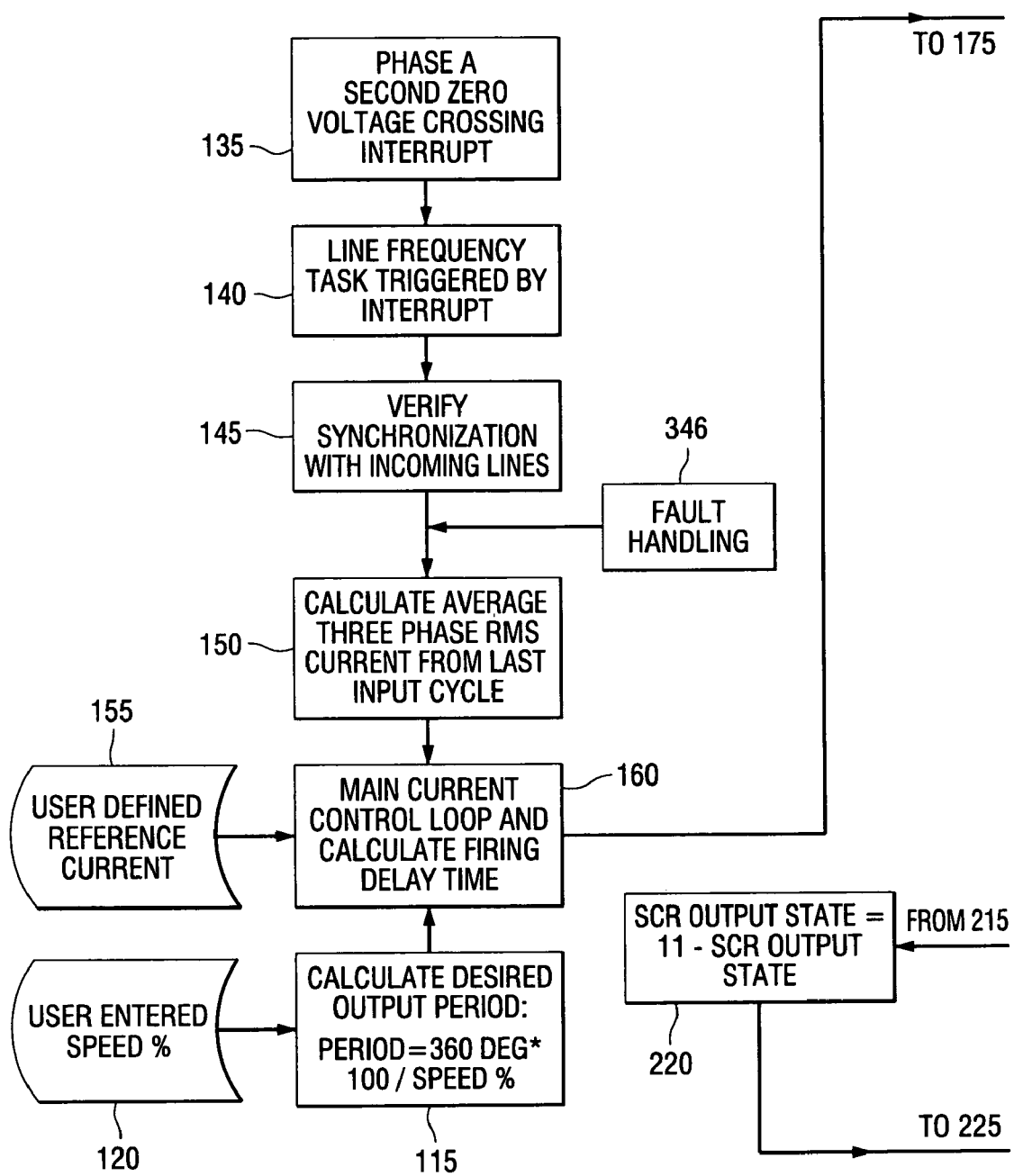
FIGS. 4A and 4B, is a diagrammatic representation of the sequence of steps performed in selecting and programming the proper output states and conditions for executing at line frequency of the solid state starter, in accordance with the present invention.
Figure 4B:
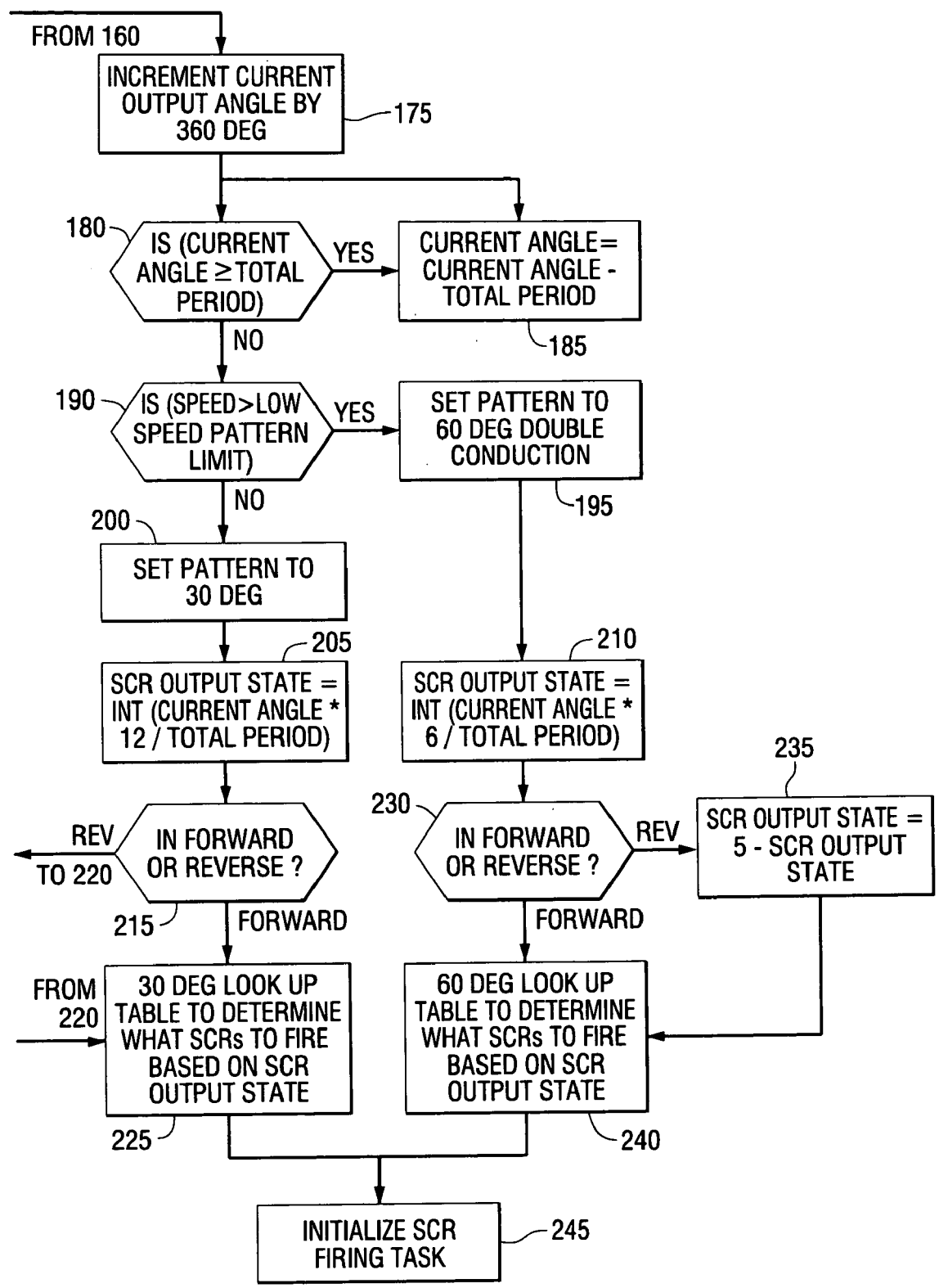

FIG. 4 is a diagrammatic flow chart of the Line Frequency Task with respect to solid-state starter 65. The Line Frequency Task is a task or sequence of events during which the main calculation of each function of solid-state starter 65, as applicable to the controlled gating sequence method is completed. During the Line Frequency Task, the individual control of the gating of each SCR, as previously described, is accomplished through the application of this method. Once solid-state starter 65 is initialized, each waveform corresponding to its associated phase of power supply 12 cycles through its input line cycle shown in FIG. 2. Upon the second zero voltage crossing 90' of the phase A voltage at 180°, an interrupt is generated at step 135. The interrupt generated at step 135 initiates the Line Frequency Task functions at step 140.

A synchronization verification step 145 of solid state starter 65 is performed by the digital controller with respect to the phase input cycles as delivered by the phase input lines 14, 16 and 18 of power supply 12 to soft starter 65. During the synchronization verification step 145, the digital controller determines if the input lines 14, 16 and 18 of the appropriate phases of power supply 12 are delivering power of the same frequency, voltage, and phase sequence as solid state starter 65. The synchronization verification step 145 is necessary to ensure that each SCR 20, 25, 30, 35, 40 and 45 is gated and fired at the proper time. If input supply synchronization did not occur, the gating of each SCR 20, 25, 30, 35, 40 and 45 would be random and produce results that are contrary to the desired outcome of the controlled gating sequence method. The occurrence of a fault at step 346 causes a fault indication to be displayed or otherwise communicated with the user and operation is halted In order to initiate the rotation of an induction motor, the firing of each SCR 20, 25, 30, 35, 40 and 45 is timed to ensure that the appropriate voltage is applied to the stator windings of the motor. In order to gate each SCR 20, 25, 30, 35, 40 and 45 at the proper time, the current level flowing through each phase of the power supply 12 is measured and controlled. This measurement is performed by calculating the root mean square, or RMS, of the current level from the last input cycle at step 150, which takes into account the current of each phase of power supply 12. The RMS value of an AC waveform is the value of an alternating current that corresponds to the steady DC waveform that provides an equivalent power dissipation over a specific period of time. The RMS value of current is determined by the equation:

$$Irms = \sqrt{\frac{1}{n} \sum_{i=1...n} (I_{sampled})^2}$$

where $I_{sampled}$ is the sampled current at point i. The calculation of the average three-phase RMS involves a calculation of the RMS value of the current for each of phase A, phase B and phase C with the three results being averaged together. The current measurement is performed through a current measuring device, such as a current transformer or Hall-effect based current sensor incorporated into solid state starter 65.

The phase current can be measured on an individual input line cycle basis or on an output cycle basis. If the current is measured on an individual input line cycle basis, a full output cycle's current is not measured because the input cycle is always shorter than the output cycle. Measuring the phase current on an input line cycle basis does not account for the variation in the timing of the different output states and overlap of the firing of each SCR 20, 25, 30, 35, 40 and 45. This may result in misinterpretation of the result as the current fluctuates due to the timing and overlap effects. However, if the calculated RMS current value at step 150 is based on an output cycle, each current measurement must be stored during multiple input line cycles to provide a value based on a full output cycle.

The current control loop 160 provides closed loop control of the RMS current value. The user defines a reference current 155, or set point, which is the current that should be applied to the motor. The current control loop 160 provides a continuous feedback loop to take any required corrective action whenever there is any deviation from the user-defined reference current 155. Each time the input line cycle is repeated, the user-defined reference current 155 is compared to the calculated RMS current value 150. Based on the deviation between the values, current control loop 160 adjusts the firing angle and hence the on-time of each SCR to increase or decrease the applied voltage to the motor. The adjustments made to the applied voltage through the firing of each SCR causes the motor current to closely approximate the user-defined current reference.

It can be appreciated that calculating the RMS current value 150 on an output cycle basis requires a certain amount of time to implement. Only one RMS current value calculation 150 is performed for each output cycle, and, as described above, the output cycle is longer than the input line cycle. The current control loop 160 is provided with current feedback only once every output cycle. At very slow output speeds, such as 1%, this can be an unacceptably long time period and may be greater than 0.6 seconds.

At the start of each subsequent input cycle, the current output angle is incremented by 360° at step 175 to account for the start of a new input cycle. Solid state starter 65 compares the current output angle, as incremented at step 175, to the output period 115. If the current angle is greater than the total period, the current angle is recalculated to a valid angle by removing one complete output cycle's total angle from the variable.

Solid state starter 65 uses two similar firing patterns to produce the slow motor speeds. At speeds that are available for selection according to Table 1, which are less than or equal to 8⅓%, a 30° pattern is used for improved smoothness of rotation. The 30° pattern rotates the magnetic field of the motor in 30° increments and produces twelve possible output states, as further described with respect to Table 2. At speeds that are available for selection in accordance with Table 1 that are higher than 8⅓%, a 60° conduction pattern, as further described with respect to Table 3, is used to rotate the magnetic field of the motor in 60° increments and results in six possible output states.

There is no upper or lower speed limit associated with either firing pattern. For example, the 30° conduction pattern can be used at higher speeds, however, a loss of motor torque occurs because of the reduced motor current due to only two SCRs conducting in six of the twelve given states. Conversely, the 60° double conduction pattern may also be used at lower speeds, but with an increase in cogging, which reduces the smoothness of the rotation of the motor. Cogging is a result of cycling the rotor through large discrete angles at a low speed. It should be noted that utilization of a 60° single conduction pattern can also be used, however, this pattern has been shown in simulation and laboratory testing to produce less torque than the 60° double conduction pattern due to reduced motor currents with no appreciable benefits.

Referring again to FIG. 4, the firing pattern for each SCR 20, 25, 30, 35, 40 and 45 is calculated on a per input line cycle basis. The firing pattern for each SCR 20, 25, 30, 35, 40 and 45 is determined by the present output angle as calculated by the digital controller. At step 190, the digital controller compares the desired motor speed to the low speed pattern limit, which is the maximum speed for each pattern. If the instantaneous speed of the motor is greater than the low speed pattern limit, the pattern is set to a 60° double conduction pattern at step 195. If the current speed is less than the low speed pattern limit, the pattern is set to a 30° conduction pattern at step 200. With respect to either pattern, the SCR gating sequence for each output state is predetermined and stored in a reference or look-up table in the digital controller. The SCR output state for the 30° conduction pattern as calculated at step 205 is equal to:

$$SCR \text{ Output State} = \frac{INT \text{ (Current Angle} * 12)}{\text{Output Period}}$$

Similarly, because the 60° double conduction pattern is rotated in 60° increments, there are six total output states. The SCR output state for the 60° double conduction pattern as calculated at step 210 is equal to:

$$SCR \text{ Output State} = \frac{INT \text{ (Current Angle} * 6)}{\text{Output Period}}$$

Next, the digital controller of solid state starter 65 determines if the motor is operating in a forward or reverse direction at step 215, with respect to the 30° conduction pattern, or at step 230, with respect to the 60° double conduction pattern. If the motor is operating in a reverse direction, an additional calculation must be performed. With regard to the 30° conduction pattern, the final SCR output state at step 220 is equal to:

SCR Output State=11−SCR Output State

Similarly, with respect to the 60° double conduction pattern, the SCR output state at step 235 is equal to:

SCR Output State=5−SCR Output State

The digital controller of solid state starter 65 references the appropriate table to determine which of SCR 20, 25, 30, 35, 40 and 45, or combination of SCRs, should be fired during the operation of the motor in the reverse direction.

If the motor is being operated in a forward direction, the digital controller references the appropriate table to determine the SCR, or combination of SCRs, that should be gated for the particular SCR output state as determined at steps 205 and 210.

Table 2 is the reference table utilized with the 30° conduction pattern and correlates the present SCR output state, as determined from the above calculations at 205, 210, 220 and 235 with the conductive SCR 20, 25, 30, 35, 40 and 45, or SCRs, for each state. For this conduction pattern, the table also references the appropriate magnetic field angle created when certain of SCRs 20, 25, 30, 35, 40 and 45 are gated on. In order to control current the SCRs are gated at a precise time relative to the line to neutral input power called the firing angle. The firing angle is the number of degrees from the beginning of a line to neutral input line cycle that the appropriate SCR 20, 25, 30, 35, 40 and 45 is gated to an on status corresponding to electrical angle 76 of FIG. 2.

For a particular output state, if an SCR 20, 25, 30, 35, 40 and 45 is indicated as a gated SCR, the SCR 20, 25, 30, 35, 40 and 45 is fired at the appropriate angle. If the SCR 20, 25, 30, 35, 40 and 45 is not indicated as a gated SCR 20, 25, 30, 35, 40 and 45, the current flowing through the SCR 20, 25, 30, 35, 40 and 45 during that state is zero. In this case, the SCR 20, 25, 30, 35, 40 and 45 acts as an open switch during the particular referenced angle of the associated output state.

TABLE 2

| Output State | Gated SCRs | Firing angle |
|---|---|---|
| 0 | A+, B−, C+ | 120 |
| 1 | A+, B− | 150 |
| 2 | A+, B−, C− | 180 |
| 3 | A+, C− | 210 |
| 4 | A+, B+, C− | 240 |
| 5 | B+, C− | 270 |
| 6 | A−, B+, C− | 300 |
| 7 | A−, B+ | 330 |
| 8 | A−, B+, C+ | 0 |

TABLE 2-continued

| Output State | Gated SCRs | Firing angle |
|---|---|---|
| 9 | A−, C+ | 30 |
| 10 | A−, B−, C+ | 60 |
| 11 | B−, C+ | 90 |

Table 3 shows the assigned output state number, the conductive SCRs and the firing angle for the 60° double conduction pattern.

TABLE 3

| Output State | Gated SCRs | Firing angle |
|---|---|---|
| 0 | A+, B−, C+ | 120 |
| 1 | A+, B−, C− | 180 |
| 2 | A+, B+, C− | 240 |
| 3 | A−, B+, C− | 300 |
| 4 | A−, B+, C+ | 0 |
| 5 | A−, B−, C+ | 60 |

Figure 6:
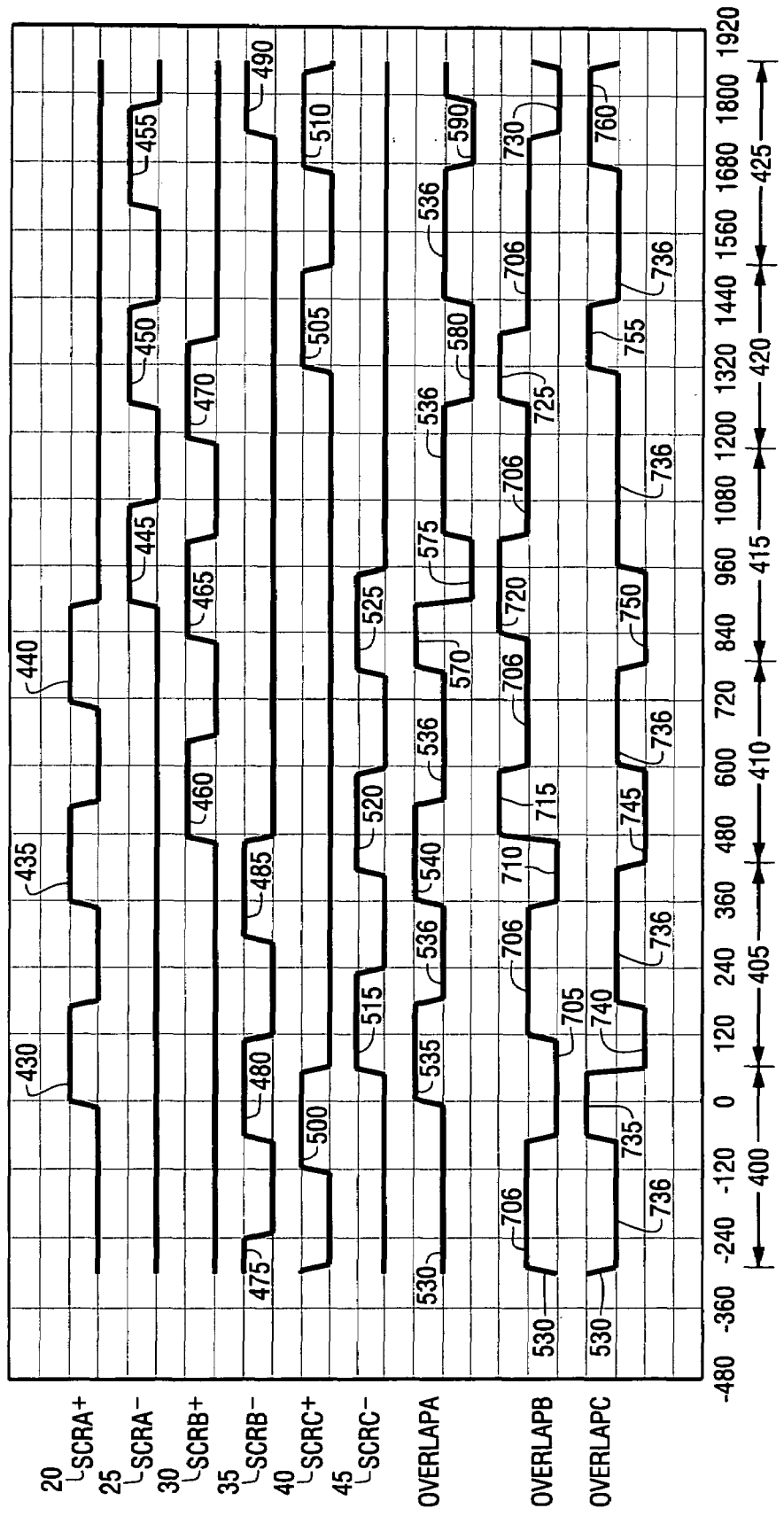
FIG. 6 is a graphical illustration of a series of SCR firing sequences for each phase of a three-phase power supply.

While the SCRs may be fired in numerous combinations, only certain combinations have useful application, as will be further described with respect to FIG. 6. A useful SCR output state containing at least one positive and one negative SCR firing together such that current can flow through the motor. Combinations may include either one positive and two negative devices or two positive and one negative device to achieve such current flow.

Figure 5A:
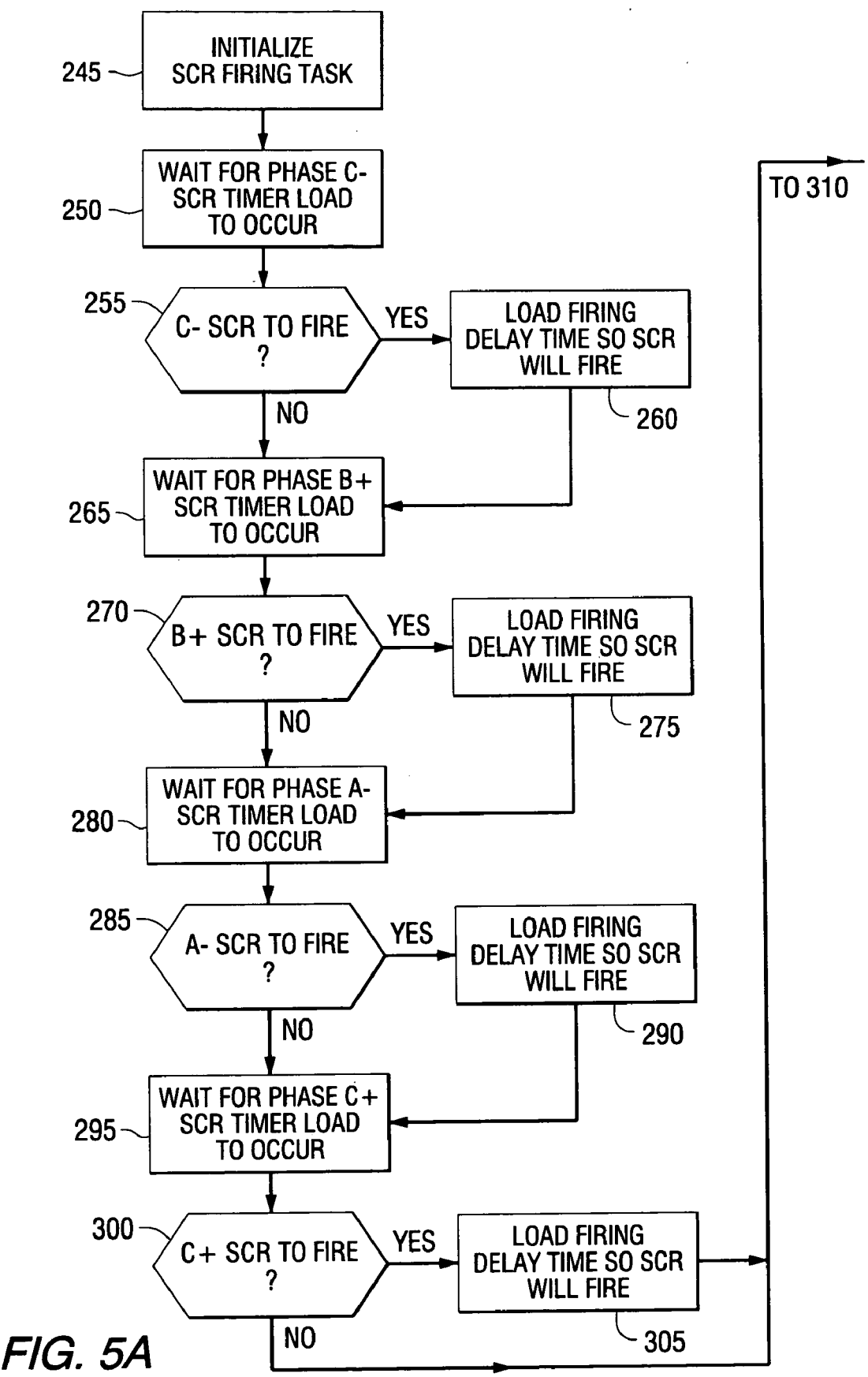
FIGS. 5A and 5B, is a diagrammatic representation of the sequence of steps used to control the gating of the SCRs of the solid state starter.
Figure 5B:
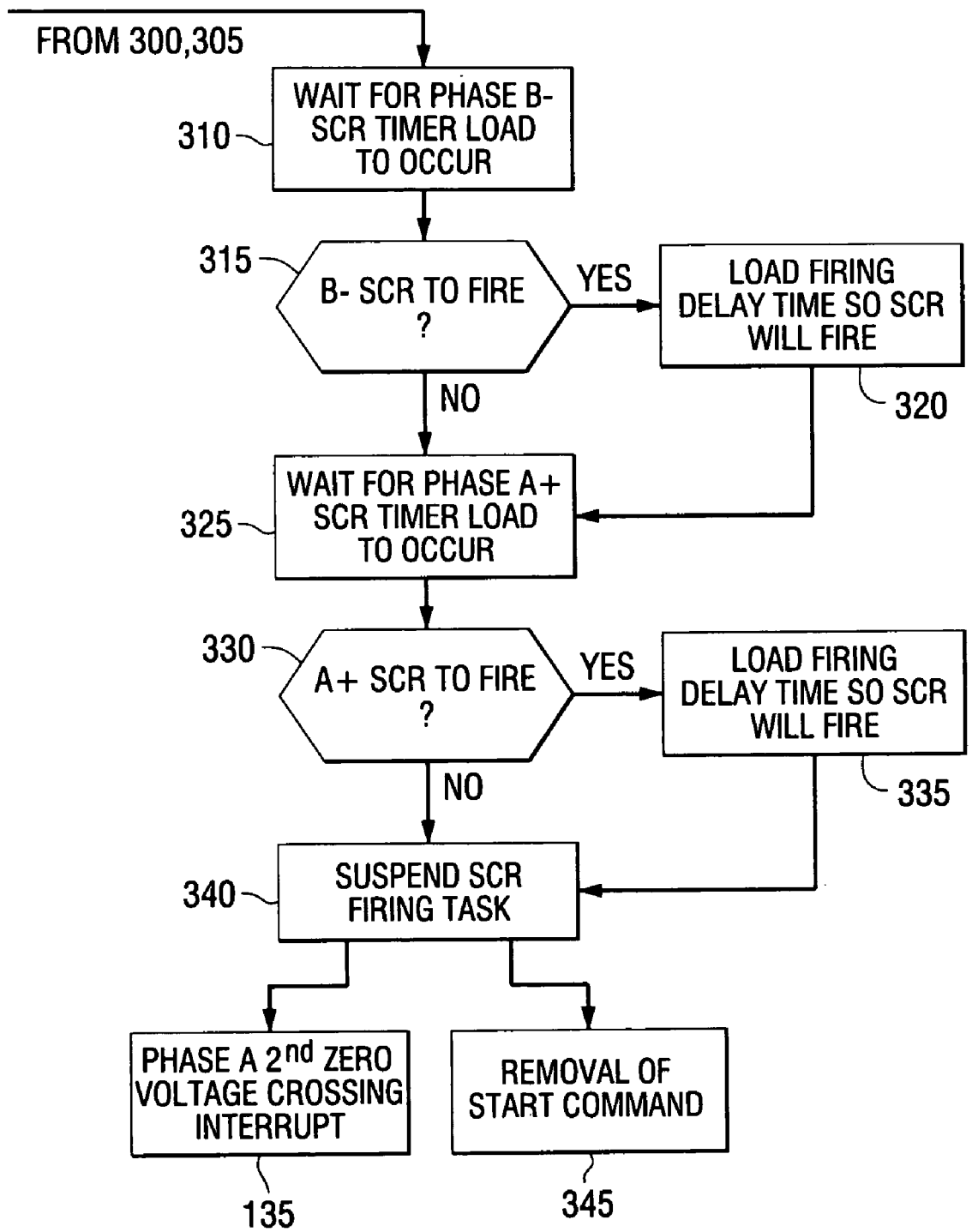

Once the Line Frequency Task functions of FIG. 6 are complete, the SCR Firing Task is initialized at step 245, as further described with respect to FIG. 5. The SCR Firing Task implements the information calculated in the Line Frequency Task functions including the sequence of firing and firing delay time of each SCR 20, 25, 30, 35, 40 and 45 for the next input cycle. The information is implemented by an output comparative function contained within the digital controller of solid state starter 65. For each phase, the digital controller gates the appropriate SCR 20, 25, 30, 35, 40 and 45, or SCRs, at the predetermined time.

As stated earlier, the firing pattern for the SCRs is calculated on a per input line cycle basis. This calculation is triggered by an input phase A voltage second zero crossing such as at point 90 or FIG. 2, causing an interrupt at step 135. Ideally, whether an SCR is fired should be calculated individually immediately prior to the time that each SCR would fire. The once per input cycle calculation time basis is primarily used to reduce the resource utilization and computation time required of the digital controller.

Referring to FIG. 5, at the end of each Line Frequency Task, as described in FIG. 4, the output state and the corresponding SCR 20, 25, 30, 35, 40 and 45, or group SCRs, and the associated firing angles, are loaded into the control electronics of soft starter 65. Although each SCR 20, 25, 30, 35, 40 and 45, or group of SCRs, uses the same firing angle period during each input line cycle, it can be appreciated that the firing angle of each SCR 20, 25, 30, 35, 40 and 45, or group of SCRs can be individually controlled. Thus, a certain SCR 20, 25, 30, 35, 40 and 45, or group of SCRs, can have different firing angle periods. Additionally, the SCR Firing Task as described below with respect to FIG. 6 can be applicable if the motor is operating in a forward or reverse direction.

The control electronics of the digital controller of soft starter 65 cycle through the control electronics of each SCR 20, 25, 30, 35, 40 and 45 to load the appropriate firing angle of each SCR 20, 25, 30, 35, 40 and 45. The digital controller associates each SCR 20, 25, 30, 35, 40 and 45 to its position in the predetermined gating sequence through an output compare function and determines whether an SCR should be fired during the output cycle.

In FIG. 5, the digital controller initializes the output compare function with respect to SCR 45 to determine if it should be fired during the output cycle, at step 250. At step 255, the digital controller evaluates the position of SCR 45 in each output state of the predetermined gating sequences, such as the gating sequences shown in Tables 2 and 3. If SCR 45 should be fired, the digital controller sends a signal to the control electronics for SCR 45 to set the appropriate firing angle at step 260. If SCR 45 should not be fired during the output cycle, the digital controller initializes the output compare function with respect to SCR 30 at step 265 to determine if SCR 30 should be fired during the output cycle.

At step 270, the digital controller evaluates the position of SCR 30 in each output state of the predetermined gating sequences, such as the gating sequences shown in Tables 2 and 3. If SCR 30 should be fired, the digital controller sends a signal to the control electronics for SCR 30 to set the appropriate firing angle at step 275. If SCR 30 should not be fired during the output cycle, the digital controller initializes the output compare function with respect to SCR 25 at step 280 to determine if SCR 25 should be fired during the output cycle.

At step 285, the digital controller evaluates the position of SCR 25 in each output state of the predetermined gating sequences, such as the gating sequences shown in Tables 2 and 3. If SCR 25 should be fired, the digital controller sends a signal to the control electronics for SCR 25 to set the appropriate firing angle at step 290. If SCR 25 should not be fired during the output cycle, the digital controller initializes the output compare function with respect to SCR 40 at step 295 to determine if SCR 40 should be fired during the output cycle.

At step 300, the digital controller evaluates the position of SCR 40 in each output state of the predetermined gating sequences, such as the gating sequences shown in Tables 2 and 3. If SCR 40 should be fired, the digital controller sends a signal to the control electronics for SCR 40 to set the appropriate firing angle at step 305. If SCR 40 should not be fired during the output cycle, the digital controller initializes the output compare function with respect to SCR 35 at step 310 to determine if SCR 35 should be fired during the output cycle.

At step 315, the digital controller evaluates the position of SCR 35 in each output state of the predetermined gating sequences, such as the gating sequences shown in Tables 2 and 3. If SCR 35 should be fired, the digital controller sends a signal to the control electronics for SCR 35 to set the appropriate firing angle at step 320. If SCR 35 should not be fired during the output cycle, the digital controller initializes the output compare function with respect to SCR 20 at step 325 to determine if SCR 20 should be fired during the output cycle.

At step 330, the digital controller evaluates the position of SCR 20 in each output state of the predetermined gating sequences, such as the gating sequences shown in Tables 2 and 3. If SCR 20 should be fired, the digital controller sends a signal to the control electronics for SCR 20 to set the appropriate firing angle at step 335. If SCR 20 should not be fired during the output cycle, the SCR Firing Task and is suspended at step 340. Accordingly, the gating sequence and firing angle of each SCR 20, 25, 30, 35, 40 and 45 during the most recent cycle is suspended at step 340 until the next interrupt occurs at step 135. The occurrence of the next interrupt 135 signifies that a second zero voltage crossing has occurred, and the Line Frequency Task at step 140 is once again initiated.

The operation of solid state starter 65, as shown in FIGS. 4, 5 and 6, and the associated controlled gating sequence method of the present invention, repeat until the start command is removed at step 345. Similar to the initiation of the operation of solid state starter 65, the start command may be removed by the manipulation of a key on a user communications interface of the solid state starter 65, a the change in other control inputs, or through other communication means. The occurrence of a fault at step 346, as described above, can also cease the operation of solid state starter 65.

FIG. 6 illustrates a specific example of the 60° double induction SCR firing sequence in accordance with the present invention. In this particular example, an output speed of 16⅔% is selected as the desired output speed. Accordingly, the 60° double conduction pattern is used because the user-defined speed 120 is greater than 8⅓%. According to Table 1, solid state starter 65 has six input line cycles per output cycle at the desired speed of 16⅔%, thus solid state starter 65 requires 2160 degrees to complete one output cycle at 16⅔%.

The SCR gating sequences rotate through the output states in the manner 0, 1, 2, 3, 4, 5, 0, 1, 2, 3, 4, 5 and so forth. In FIG. 6, the SCR output states and the corresponding electrical angles are applied as follows:

TABLE 4

| Reference Numeral | Output State | Begins at electrical angle | Ends at electrical angle |
|---|---|---|---|
| 400 | 0 | −300 | 60 |
| 405 | 1 | 60 | 420 |
| 410 | 2 | 420 | 780 |
| 415 | 3 | 780 | 1140 |
| 420 | 4 | 1140 | 1500 |
| 425 | 5 | 1500 | 1860 |

The gating sequence, as shown in FIG. 6, is simplified for clarity and assumes that each SCR is gated at its maximum capability or on-time. When all six output states are applied for just one input cycle, each phase will apply three positive pulses using its positive SCR 20, 30 and 40 and three negative pulses using its negative SCR 25, 35 and 45 during each output cycle. For example, an arbitrary segment of a sequence is shown, illustrating the gating pattern of SCR 20, which consists of three positive pulses 430, 435 and 440, and the gating pattern of SCR 25, which consists of three subsequent negative pulses 445, 450, and 455. Similarly, the gating pattern of SCR 35 consists of three negative pulses including 475, 480 and 485, and the corresponding gating pattern of SCR 30 consists of three positive pulses 460, 465 and 470. After the final positive pulse 470 of SCR 30, SCR 35 repeats the gating pattern of three negative pulses with the first of such negative pulses represented at 490. Finally, the gating pattern of SCR 40 consists of three positive pulses, including two initial pulses, which are not shown as preceding this arbitrary period and pulse 500. The corresponding gating pattern of SCR 45 consists of three subsequent negative pulses 515, 520 and 525. After the last negative pulse 525 of SCR 45, the gating pattern of SCR 40 repeats the gating pattern of three positive pulses including 505, 510 and a third positive pulse that is also not shown.

The duration of each positive and negative pulse is 180°. In actual operation, the firing angle of each SCR 20, 25, 30, 35, 40 and 45 can be delayed depending on the command output from the current control loop 160. In a low voltage system, each SCR 20, 25, 30, 35, 40 and 45 can be gated longer for an additional 30° beyond what is represented in FIG. 5. Only the appropriate SCR 20, 25, 30, 35, 40 and 45 is gated according to the output state. However, depending on the output state, the power factor of the motor, and the firing angle of the SCR 20, 25, 30, 35, 40 and 45, a particular SCR 20, 25, 30, 35, 40 and 45 may still be conducting current well into the beginning of the next output state.

As described earlier, a useful SCR output state is signified by at least one positive and one negative SCR firing together and is necessary for current to flow through the motor. Therefore, the resultant voltage applied to the motor is distributed over the pulses provided by the gating of each SCR 20, 25, 30, 35, 40 and 45. The applied voltage is not a result of blocking the conduction of the phases. Instead, all three phases of power supply 12 are conducting and the applied voltage to the motor results from the overlap of the firing and conduction of SCRs 20, 25, 30, 35, 40 and 45.

The method produces a rotating magnetic field in motor 10 that has a net positive average torque in the desired direction of rotation at the desired speed. To accelerate a motor to a desired speed, the motor torque must exceed the load torque at all times. If the torque delivered by the motor is less than the torque of the load at any speed during the start cycle, the motor will cease accelerating. By maintaining the applied voltage and frequency, sufficient torque can be generated to accelerate the motor.

The voltage of phase A that is applied to the motor is represented by the overlap of phase A voltage in FIG. 6. The overlap of phase A voltage is either positive or negative of the zero voltage line 530 and is a combination of the firing of SCR 20 and SCR 25 concurrently with an oppositely poled SCR. With reference to Table 3, the applied voltage of phase A 535 in output state 0, as represented at 400, is a result of the overlap of the firing of the positive pulse 430 of SCR 20 and the negative pulse 480 of SCR 35 because both SCR 20 and SCR 35 are gated at the same time. A positive voltage of phase A is applied for the duration of the first positive pulse 430 which continues into output state 1, represented at 405.

During output state 1, represented at 405, the applied voltage of phase A continues into output state 1 and corresponds to the positive pulse 480 of SCR 20 and negative pulse 480 of SCR 35. However, as SCR 35 becomes nonconductive, SCR 45 becomes conductive with negative pulse 515. The applied voltage of phase A remains positive until the cease of activity of SCR 20. Immediately following the activity, phase A enters a nonconductive period 536.

As output state 1 405 ends, SCR 20 becomes conductive again with a second positive pulse 435. The applied voltage of phase A at 540 at the end of output state 1 corresponds to the second positive pulse 435 of SCR 20 and the negative pulse 485 of SCR 35. As output state 2 410 is entered, SCR 20 is still conductive as a result of the continued pulse of 435, but SCR 35 ceases activity. At this time, the negatively poled SCR 45 has become conductive and fires negative pulse 520. Thus, a positive phase A voltage is applied until the end of the second positive pulse 435 of SCR 20. Immediately following this activity, phase A enters a nonconductive period 536.

At the end of output state 2 410, SCR 20 becomes conductive again with positive pulse 440. However, there is no negative pole SCR activity occurring at this time, thus, phase A voltage remains zero. At the beginning of output state 3 415, SCR 20 is still firing positive pulse 440 as SCR 45 begins to fire negative pulse 520. The positive applied voltage of phase A at 570 is maintained until SCR 20 ceases activity. Immediately subsequent to this cessation of activity of SCR 20, SCR 25 fires negative pulse 445 causing the applied voltage of phase B to become negative at 575. At this time during output state 3 415, SCR 30 becomes conductive by firing positive pulse 465. Phase A then enters another nonconductive period 536 until output state 4 420 is entered.

In output state 4 420, the negative applied voltage of phase A at 580 is a result of the firing of a negative pulse 450 of SCR 25, a positive pulse 470 of SCR 30 and a positive pulse 505 of SCR 40. Finally, in output state 5 425, the negative applied voltage of phase A at 590 is a result of the firing of a negative pulse 455 of SCR 25 and a positive pulse 510 of SCR 40.

FIG. 6 further represents the applied voltage with respect to phase B and phase C. The overlap of each phase is determined by the conductive SCRs 20, 25, 30, 35, 40 and 45 of each output phase of the 60° double conduction pattern as represented by Table 3.

The voltage of phase B that is applied to the motor is represented by the overlap of phase B voltage in FIG. 6. The overlap of phase B voltage is either positive or negative of the zero voltage line 530 and is a combination of the firing of SCR 30 and SCR 35 concurrently with an oppositely poled SCR. With reference to Table 3, the overlap of phase B is in a nonconductive period 706 during a portion of output state 0 400. Although a negative pulse 475 of SCR 35 is being fired, there are no oppositely poled SCRs being fired at this time. Thus the applied voltage during the initial portion of output state 0 400 is zero. During the remainder output state 0, represented at 400, a negative applied voltage of phase B 705 is a result of the overlap of the firing of a negative pulse 480 by SCR 35 and a positive pulse 500 of SCR 40.

During output state 1, represented at 405, the negative applied voltage 705 of phase B as negative pulse 480 continues into output state 1 corresponds to a positive pulse 430 of SCR 20 and negative pulse 480 of SCR 35. Phase B enters then a nonconductive period 706 for the most of the duration of output state 1 405.

As output state 1 405 ends, SCR 35 becomes conductive again with a negative pulse 485. The applied voltage of phase B at 710 at the end of output state 1 corresponds to negative pulse 485 of SCR 35 and a positive pulse 435 of SCR 20. During output state 2 410, SCR 20 and SCR 35 become nonconductive and SCR 30 and SCR 45 become conductive with positive pulse 460 and negative pulse 520, respectively. This causes the applied voltage of phase B 715 to be positive. Immediately following this activity, phase B enters a period of inactivity 706.

At the beginning of output state 3 415, SCR 30 becomes conductive with positive pulse 465. During a portion of positive pulse 465, SCR 45 is also firing a negative pulse 525. The applied voltage of phase B 720 is thus positive. As SCR 45 becomes nonconductive, SCR 25 becomes conductive firing negative pulse 445. The positive voltage of phase B 720 continues to be applied in output state 3 415 until the end of positive pulse 465. At this time, phase B enters another nonconductive period 706.

In output state 4 420, the positive applied voltage of phase B at 725 is a result of the firing of SCR 25, which corresponds to negative pulse 450, and SCR 30, which corresponds to positive pulse 470. A period of inactivity of applied phase B voltage 706 follows this activity. Finally, in output state 5 425, the negative applied voltage of phase B 730 is a result of the firing of SCR 35, corresponding to negative pulse 490, and SCR 40, which corresponds to positive pulse 510.

The voltage of phase C that is applied to the motor is represented by the overlap of phase C voltage in FIG. 6. The overlap of phase C voltage is either positive or negative of the zero voltage line 530 and is a combination of the firing of SCR 40 and SCR 45 concurrently with an oppositely poled SCR. With reference to Table 3, the positive applied voltage of phase C 735 in output state 0, as represented at 400 is a result of the overlap of the firing of SCR 35, corresponding to negative pulse 480, and SCR 40, which corresponds to positive pulse 500, because both SCR 35 and SCR 40 are gating at the same time. The positive voltage of phase C 735 is applied for the duration of the positive pulse 500. In output state 1 405, SCR 40 becomes nonconductive and SCR 45 immediately fires a negative pulse 515 causing the applied voltage of phase C to become negative at 740. As SCR 45 fires negative pulse 515, SCR 20 is firing positive pulse 430. Phase C applied voltage then enters a period of inactivity 736.

As output state 2 410 is entered, SCR 45 becomes conductive again with a negative pulse 520. At this time, SCR 20 is also firing a positive pulse 435, and SCR 30 is firing a positive pulse. Thus, the applied voltage 745 of phase C corresponds to SCR 45, 20 and 30. After this period of activity, phase C enters a period of inactivity 736.

At the beginning of output state 3 415, the negative applied voltage of phase C 750 is a result of the negative pulse 525 of SCR 45 and positive pulse 465 of SCR 30. Again, phase C enters a period of inactivity 736. In output state 4 420, the positive applied voltage of phase C 755 corresponds to SCR 45, which fires a positive pulse 505, and SCR 25, which fires a negative pulse 450. Finally, in output state 5, the applied voltage 760 is a result of SCR 40, which corresponds to positive pulse 510; SCR 25, which corresponds to negative pulse 455; and SCR 35, which corresponds to negative pulse 490.

Figure 7:
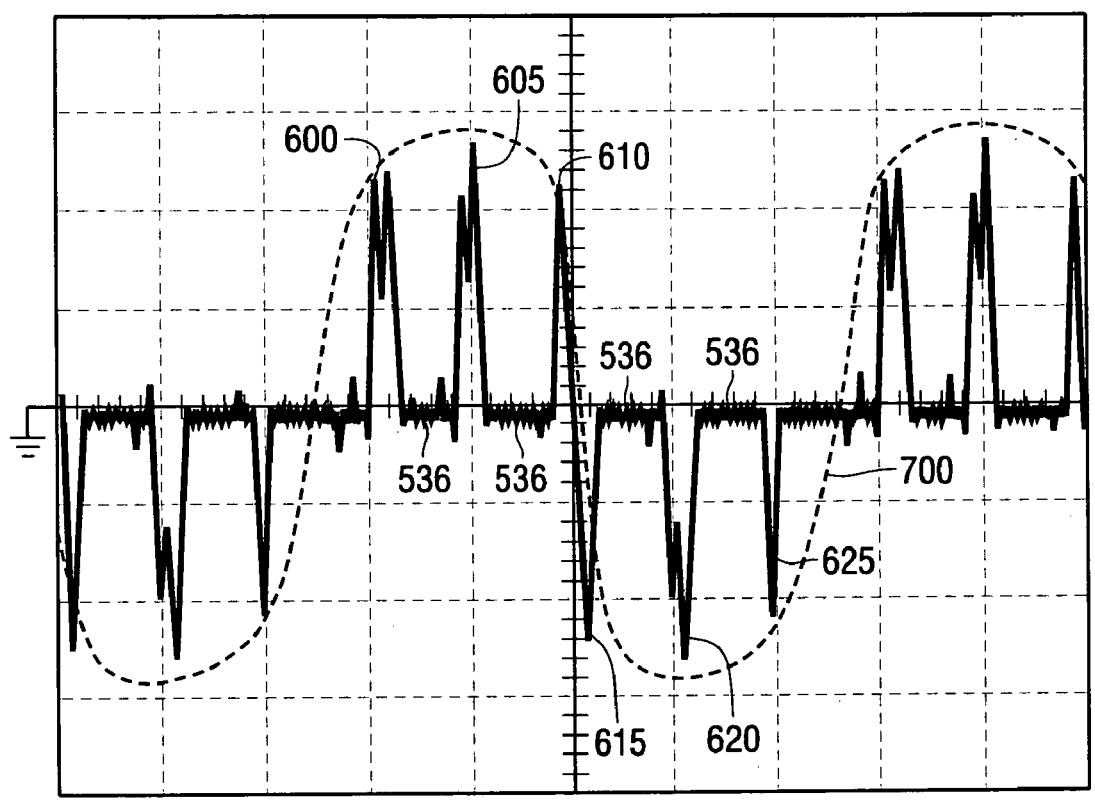
FIG. 7 is a representative graphical illustration of a waveform output corresponding to phase A of one cycle of a SCR gating sequence.

FIG. 7 represents the current waveform of phase A during the operation of the present invention at 16⅔%, as described with respect to the overlap of phase A of FIG. 6. The applied voltage at 535 of phase A is represented by the current waveform in FIG. 7 at 600. This represents the current flowing at the end of output state 0 400 and into output state 1 405. The double peak of current is a result of the natural wave shift of the input waveform because of the three-phase power supply. Similarly, the current waveform at 605 of FIG. 7 corresponds to the applied voltage at 540 in FIG. 6 followed by the period of inactivity 536. The current waveform at 610 and 615 of FIG. 7 represent the positive to negative voltage shift as shown by the applied voltage 570 and 575 in FIG. 6. Again, a period of inactivity 536 follows the applied voltage. Finally, the current waveform at 620 in FIG. 7 represents the applied voltage 580 of output state 4 420 in FIG. 6, and the current waveform at 625 in FIG. 7 represents the output state 5 425 applied voltage 590 in FIG. 6. The combined total current waveform of phase A 700 approximates the continuous sinusoidal phase A waveform 80 of FIG. 2, but is a result of the overlap of pulses from each of phase A, phase B and phase C.

It can be appreciated by one skilled in the art that a similar current waveform pattern is produced with respect to the overlap of phase B and the overlap of phase C. The sinusoidal waveform produced for each of phase A, phase B and phase C overlap have a 120° offset from each other. Further, during the period of inactivity of phase A, current is flowing in phase B and phase C due to this offset of the phases, as represented by the overlap of phase A, phase B and C.

Although particular embodiments of the present invention have been illustrated in the accompanying drawings and described in the foregoing detailed description, it is to be further understood that the present invention is not to be limited to just the embodiments disclosed, but that they are capable of numerous rearrangements, modifications and substitutions, as identified in the following claims.

What is claimed is:

1. A method of adjustably controlling the rotational speed of a polyphase AC motor which is supplied by a polyphase source of AC electricity, comprising:
   providing a plurality of input waveforms, having one for each phase of said polyphase source;
   dividing each of said input waveforms into separate positive and negative pulsed waveforms according to a preselected output frequency and gating pattern;
   selecting appropriate of said positive and negative pulsed waveforms which are aligned in time according to said preselected output frequency and gating pattern to form a combined AC output waveform having a preselected frequency; and
   applying said combined AC output waveform to said polyphase AC motor which is adjustably rotated at less than the rated speed of said polyphase AC motor.

2. A method as described in claim 1, wherein said polyphase AC motor is rotated in one of a forward and a reverse direction.

3. A method as described in claim 1, wherein dividing each of said input waveforms into separate positive and negative pulsed waveforms according to a preselected output frequency and gating pattern sequence produces a rotating magnetic field in said polyphase AC motor that has a net positive average torque in the desired direction of rotation at the desired speed.

4. A method as described in claim 3, wherein said preselected output frequency and gating pattern is selected based upon the desired rotational speed of the AC motor.

5. A method as described in claim 4, wherein said preselected output frequency and gating pattern incorporates one of a 30 degree and a 15 degree conduction pattern for desired rotational speeds of the AC motor of less than 8⅓ percent.

6. A method as described in claim 5, wherein said conduction pattern is 30 degrees and said AC motor is a three phase motor.

7. A method as described in claim 5, wherein said conduction pattern is 15 degrees and said AC motor is a six phase motor.

8. A method as described in claim 4, wherein said gating pattern produces an average net positive torque in the desired direction of rotation that has a reduced pulsating torque component than the maximum average net positive torque.

9. A method as described in claim 4, wherein said preselected output frequency and gating pattern incorporates a one of a 60 degree and a 30 degree conduction pattern for desired rotational speeds of the AC motor of greater than 8⅓ percent.

10. A method as described in claim 9, wherein said conduction pattern is 60 degrees and said AC motor is a three phase motor.

11. A method as described in claim 9, wherein said conduction pattern is 30 degrees and said AC motor is a six phase motor.

12. A method as described in claim 4, wherein said gating pattern produces the maximum average net positive torque in said polyphase AC motor.

13. A method as described in claim 1, wherein said gating pattern may be adjusted when said AC motor is stopped.

14. A method as described in claim 1, wherein said gating pattern may be adjusted during AC motor operation.

15. A method as described in claim 1, wherein said input waveforms are variable for an associated preselected output frequency and gating pattern to produce said adjustable rotation.

16. A method as described in claim 1, wherein said output waveforms are compared with a reference value and the preselected output frequency and gating pattern is automatically adjusted to cause the AC motor to correlate to the reference value and to minimize motor heating.

17. A method as described in claim 1, wherein said preselected output frequency and gating patterns are preset in accordance with a fixed reference value.

18. A method as described in claim 1, wherein said preselected output frequency and gating pattern is selected to minimize DC offsets in the motor phase currents.

19. A method as described in claim 1, wherein dividing each of said input waveforms comprises the use of discrete SCR gate circuits for each of said input waveforms.

20. A method as described in claim 19, wherein said preselected output frequency and gating patterns are utilized to control the operation of said discrete SCR gate circuits.

21. A method as described in claim 20, wherein each output state of each SCR gate circuit is calculated as:

$$SCR\ Output\ State = 11 - \left(\frac{INT\ (Current\ Angle * 12)}{Output\ Period}\right)$$

wherein said Output Period is defined as:

$$Period = \frac{360\ degrees * 100}{Speed\ \%\ entered\ by\ user}.$$

22. A method as described in claim 21, wherein said gating pattern is a 30 degree pattern.

23. A method as described in claim 22, further comprising input waveforms A, B, C and said preselected frequency and gating pattern comprises:

| Output State | Gated SCRs | Firing angle |
|---|---|---|
| 0 | A+, B−, C+ | 120 |
| 1 | A+, B− | 150 |
| 2 | A+, B−, C− | 180 |
| 3 | A+, C− | 210 |
| 4 | A+, B+, C− | 240 |
| 5 | B+, C− | 270 |
| 6 | A−, B+, C− | 300 |
| 7 | A−, B+ | 330 |
| 8 | A−, B+, C+ | 0 |
| 9 | A−, C+ | 30 |
| 10 | A−, B−, C+ | 60 |
| 11 | B−, C+ | 90. |

24. A method as described in claim 20, wherein each output state of each SCR gate circuit is calculated as:

$$SCR\ Output\ State = 5 - \left(\frac{INT\ (Current\ Angle * 6)}{Output\ Period}\right)$$

wherein said Output Period is defined as:

$$Period = \frac{360\ degrees * 100}{Speed\ \%\ entered\ by\ user}.$$

25. A method as described in claim 24, wherein said gating pattern is a 60 degree pattern.

26. A method as described in claim 25, further comprising input waveforms A, B, C and said preselected frequency and gating pattern comprises:

| Output State | Gated SCRs | Firing angle |
|---|---|---|
| 0 | A+, B−, C+ | 120 |
| 1 | A+, B−, C− | 180 |
| 2 | A+, B+, C− | 240 |
| 3 | A−, B+, C− | 300 |
| 4 | A−, B+, C+ | 0 |
| 5 | A−, B−, C+ | 60. |

* * * * *

UNITED STATES PATENT AND TRADEMARK OFFICE
CERTIFICATE OF CORRECTION

| | |
|---|---|
| PATENT NO. | : 7,345,449 B2 |
| APPLICATION NO. | : 11/214220 |
| DATED | : March 18, 2008 |
| INVENTOR(S) | : Barie et al. |

It is certified that error appears in the above-identified patent and that said Letters Patent is hereby corrected as shown below:

Column 3, line 21, "MicroI" should be -- MicroII --.

Column 3, line 24, after "motor" delete -- to --.

Column 3, line 25, before "produce" insert -- and --.

Column 3, line 26, delete "results in".

Column 3, line 27, delete "having" and insert -- have --.

Column 3, line 57, delete "addition".

Column 4, line 22, after "frequencies" delete -- of --.

Column 4, line 24, after "determined" insert -- a --.

Column 4, line 38, after "method" insert -- of --.

Column 13, line 28, delete "containing" and insert -- contains --.

Column 14, line 67, after "Task" delete -- and --.

Column 15, line 14, "a the change in" should be -- at the change in --.

Signed and Sealed this

Twenty-fourth Day of June, 2008

JON W. DUDAS
*Director of the United States Patent and Trademark Office*